United States Patent [19]

Perkins et al.

[11] 4,053,688
[45] Oct. 11, 1977

[54] BATTERY HOLDER

[76] Inventors: Carroll R. Perkins, 3400 Main St., Santa Ana, Calif. 92707; Jesse F. Cable, III, 4341 Rafael St., Irvine, Calif. 92714; Joseph Link, 26752 Magdalena Lane, Mission Viejo, Calif. 92675

[21] Appl. No.: 638,312

[22] Filed: Dec. 8, 1975

[51] Int. Cl.² .............................................. H01M 2/10
[52] U.S. Cl. ................................... 429/98; 58/23 BA
[58] Field of Search .......... 136/173; 58/23 BA, 88 C; 429/98

[56] References Cited

U.S. PATENT DOCUMENTS

| | | | |
|---|---|---|---|
| 3,597,913 | 8/1971 | Fiyimori | 58/23 BA |
| 3,784,725 | 1/1974 | Perkins et al. | 58/23 BA |
| 3,838,568 | 10/1974 | Zurcher et al. | 58/88 C |

Primary Examiner—Donald L. Walton
Attorney, Agent, or Firm—W. Edward Johansen

[57] ABSTRACT

The invention is a battery holder which is used to hold a pair of batteries in a modular electronic assembly having a substrate, on which an integrated circuit is mounted, and a module cap, which is concentrically, slightly larger than the substrate. The battery holder includes a module frame having a front surface, which is concentrically, slightly larger than the module cap, a back surface and a sidewall. The module frame also has a portion of its sidewall extending above the periphery adjacent to its front surface and two holes, perpendicular to its front surface and adapted to hold the pair of batteries. The battery holder also includes a metal plate, which is secured to the back surface of the module frame, for holding the pair of batteries in place.

7 Claims, 8 Drawing Figures

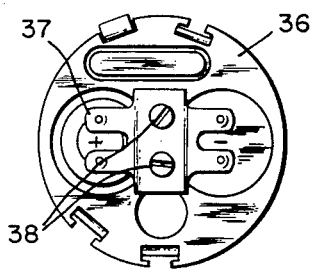
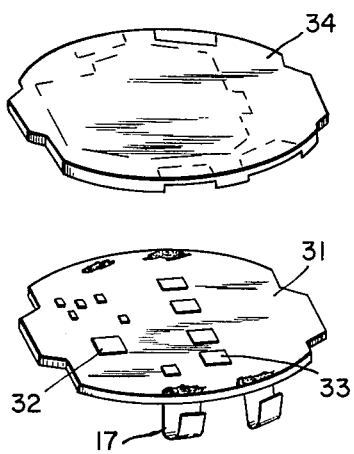
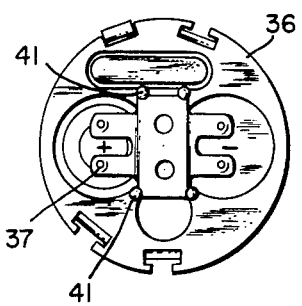
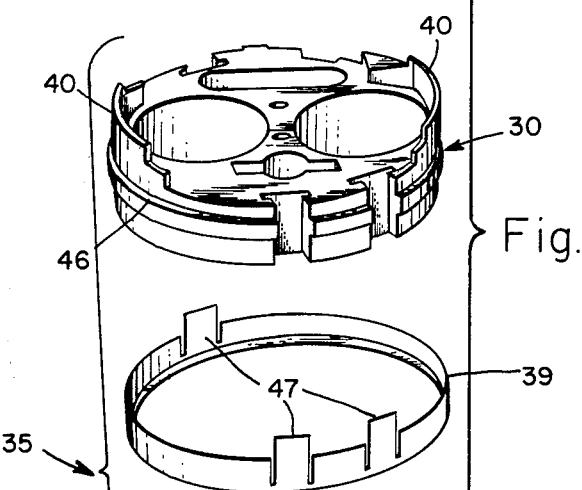
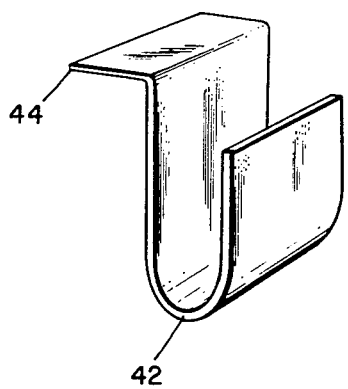
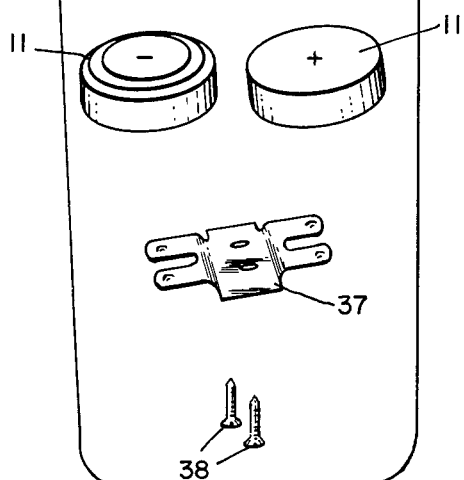
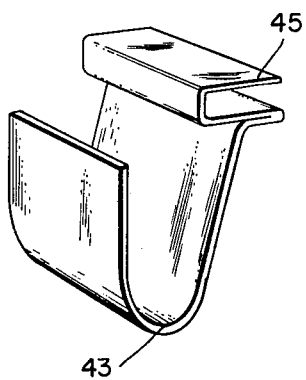

BATTERY HOLDER

BACKGROUND OF THE INVENTION

1. Field of the Invention

The present invention relates to a modular electronic assembly which is inserted in a casing, and more particularly to an improved battery holder which will allow the modular electronic assembly to operate while it is outside the casing.

2. Description of the Prior Art

Presently, all of the modular electronic assemblies are inserted into metal casings which serve not only as battery holders, but also as conduction paths for the electronic circuits in the modular electronic assemblies. Each modular electronic assembly includes a pair of 1½ volts, one cell batteries, a substrate with a printed circuit placed thereon, an electrooptical display which is mounted on the substrate and an integrated circuit chip which is mounted on the substrate and electrically connected to the electrooptical display and the pair of batteries through the printed circuit. U.S. Pat. No. 3,838,568, entitled Electronic Watch Movement Mounting and Connection, issued to Rudolf F. Zurcher and I. Benjamin Merles on Oct. 1, 1974 sets forth a description of a modular electronic assembly which is inserted in a metal casing. The modular electronic assembly includes a substrate that is mounted on a battery holder in such a manner that it may move in a lateral direction across the top surface of the battery holder. A set of springs restrains the lateral movement of the substrate across the top surface of the battery holder. At least one of the springs connects itself to the integrated circuit chip and to the metal casing when when a push-button switch is depressed so that an electrical signal can travel along a conduction path through the metal casing from one of the batteries. It is therefore essential that the casing be metallic in order for this electronic modular assembly to operate.

The above described modular electronic assembly is inoperable when it is outside the metal casing because there is no conduction path through which the electrical signal can travel from the battery to the integrated circuit chip. Generally the metal casing includes a ring having a front edge adapted to receive a viewing element, such as a watch crystal or a watch glass, and to hold that viewing element in place, and a back element adapted so that it is mechanically coupled to the ring adjacent the back edge thereof. The modular electronic assembly is placed in the ring between the viewing element and the back element, which are both secured at the front edge and the back edge of the ring, respectively.

U.S. Pat. No. 3,597,913, entitled Battery-Carrying Means For Electric or Electronic Time Piece, issued to Motoyuki Fujimori Suwa-shi on Aug. 10, 1971, teaches a battery-carrying device for an electronic assembly wherein an elastic contact projects from a cover providing access to a battery receiving device in the electronic assembly. The contact is positioned so that the battery is out of contact with the cover when it is inserted in the wrong direction. This arrangement prevents a short-circuit of the battery. The cover and the elastic contact are mounted so that they press against the outer periphery of the battery and allow an electrical current to flow to the electronic circuitry of the electronic assembly.

An insulating device is fastened to the central portion of the inner surface of the cover. The insulating device acts to prevent short-circuiting of the batteries. In the battery carrying device it should be noted that it again requires the cover to be metallic in order to operate the electronic circuit.

Another solid state wristwatch is the subject of U.S. Pat. No. 3,759,031, entitled Modular Solid State Wristwatch, issued to Robert W. McCullough and Cleon W. Hougendobler on Sept. 18, 1973. The patent discloses a solid state wristwatch that includes a substrate having a printed circuit on its back surface and having an integrated circuit chip mounted on its front surface and that is supplied with electrical power by a pair of batteries. The wristwatch also includes a modular frame on which the substrate rests and which contains the pair of batteries. The modular frame is formed from an impact-resistant, one-piece, injection molded plastic material and is disc-shaped. The modular frame has a circular rim and a solid central section with an enlarged portion having cavities, adapted to receive 1½ volts, one cell batteries. At the bottom of each cavity is a through hole which is adapted to receive an electrically conductive metallic spring for establishing an electrical connection between the pair of batteries and an electrical connection to a metal casing in which the substrate and the modular frame are placed. It is again essential that the casing be metallic in order for the solid state wristwatch to operate because the casing provides a conduction path for an electrical signal from the batteries to the integrated circuit chip.

The substrate of the above described wristwatch is secured to the modular frame by a silicone rubber adhesive which not only holds the substrate in place, but also provides shock absorption for the integrated circuit chip. The application of the silicone rubber adhesive requires an additional step in assembling the wristwatch and makes the resulting modular electronic assembly formed from the modular frame and the substrate non-uniform in size. The non-uniformity in size is only a problem when the module is placed in a relatively thin casing.

SUMMARY OF THE INVENTION

In view of the foregoing factors and conditions characteristic of the prior art it is a primary object of the present invention to provide a battery holder for a modular electronic assembly having a module casing in which its components are placed that will operate while it is outside the casing.

It is another object of the present invention to provide a battery holder which secures a substrate, on which the electronic components are placed, without the use of resiliently mounted springs or a silicone rubber adhesive.

It is also another object of the present invention to provide a battery holder which allows the use of a module casing formed from a non-conductive material.

It is still another object of the present invention to provide a battery holder which does not allow an individual to remove the batteries from the battery holder without the proper tool thereby insuring that the correct battery type will be used and that professional replacement of the batteries will allow the watch to be checked and be finely adjusted so that its accuracy may be maintained.

In accordance with an embodiment of the present invention a battery holder for use in a modular electronic assembly which includes a light emitting readout source and which also includes a substrate and a module cap, that is concentrically, slightly larger than the substrate, is described. The battery holder is a one piece module frame which is injection molded from a plastic material. The module frame has a pair of holes, substantially normal to its front surface, in which a pair of 1½ volts, one cell batteries are placed. A metal plate secures the batteries in place and is fastened to the back surface of the module frame by a pair of screws. The module frame has a pair of sidewalls extending above its periphery adjacent to the front surface and is concentrically, slightly larger than the module cap so that the substrate rests on the front surface of the module frame and within its extended sidewalls and the module cap rests on the substrate and within the extended sidewalls of the module frame to which it is chemically joined.

The features of the present invention which are believed to be novel are set forth with particularity in the appended claims. Other objects and many more of the attendant advantages of this invention will be more readily appreciated as the same becomes better understood by reference to the following detailed description and considered in connection with the accompanying drawing in which like reference symbols designate like parts throughout the figures.

DESCRIPTION OF THE DRAWINGS

FIG. 3 is an exploded view of an electronic modular assembly which has an improved battery holder having a battery connector which is secured by a pair of screws in accordance with the principles of the present invention. The battery holder has a substrate having spring connectors of a first type mechanically coupled thereto.

FIG. 4 is a bottom plan view of the battery holder of FIG. 3.

FIG. 5 is a bottom plan view of a battery holder, which is similar to the battery holder of FIG. 3, except that it has a battery connector that secures itself by snapping into the back surface of the battery holder.

FIG. 6 is a perspective view of a spring connector of a second type.

FIG. 7 is a perspective view of a spring connector of a third type.

FIG. 8 is a perspective view of a conductive, rubber o-ring.

DESCRIPTION OF THE PREFERRED EMBODIMENT

The present invention is an improved battery holder which is used in a modular electronic assembly having a light emitting readout source to hold a pair of 1½ volts, one cell batteries in place. In order to best understand the present invention it is necessary to first view an example of a prior art battery holder. The purpose of the prior art battery holder is not only to provide a device for holding the batteries, but also to provide a conduction path for an electrical signal from the batteries to the electronic components of the modular electronic assembly.

Figure 1:
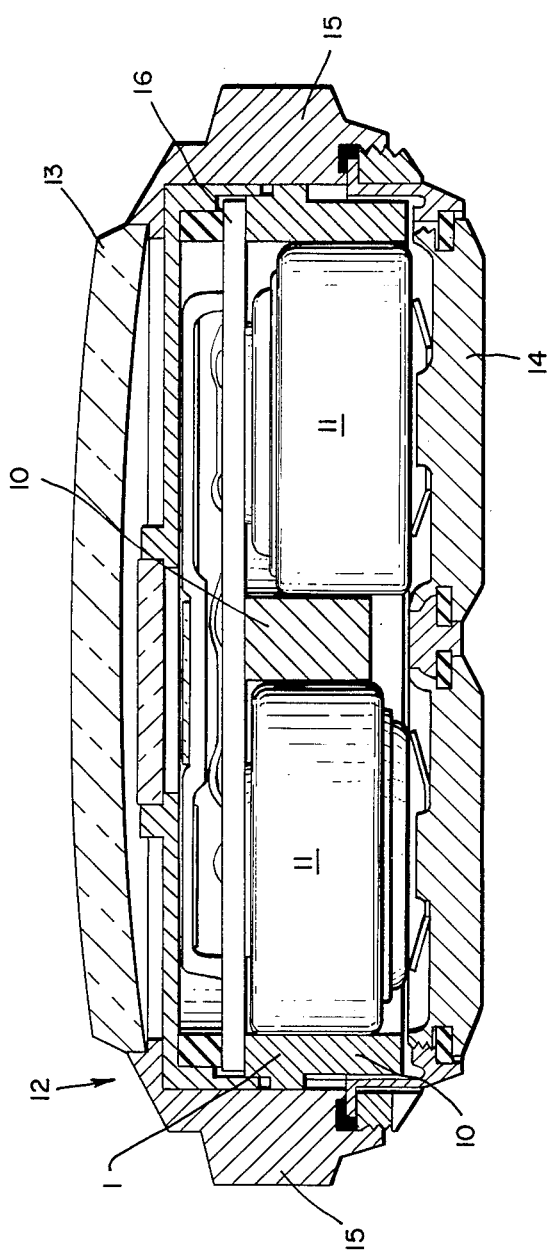
FIG. 1 is a cross-sectional view of an electronic watch movement mounting and connection according to an example of the prior art.

Referring to FIG. 1 a battery holder 10 of the prior art is shown holding two batteries 11. The battery holder 10 is placed in a metal module casing 12 which has a front surface 13, a back plate 14, and a sidewall 15. A substrate 16 is placed on the front surface of the battery holder 10.

Figure 2:
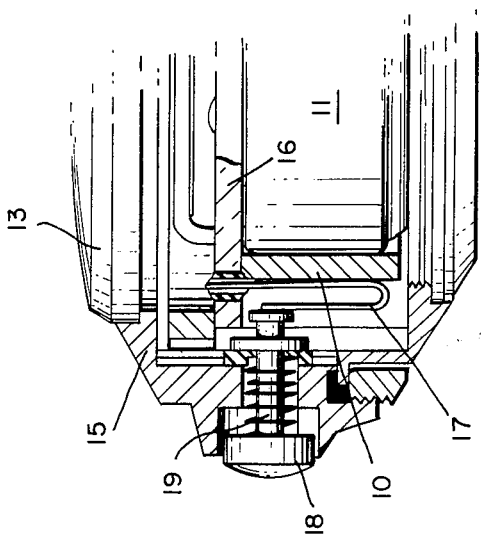
FIG. 2 is a partial cross-sectional view of the electronic watch movement mounting and connection of FIG. 1.

Referring now to FIG. 2 the substrate is secured by a set of spring connectors, which are electrically and mechanically coupled to the substrate 16 and which are mechanically coupled to the sidewall of the battery holder 10. The casing 12 has a metal plunger 18 to which it is electrically and mechanically coupled. The plunger 18 acts as a pushbutton switch which is normally held open by a coiled spring 19.

Referring again to FIG. 1 it is apparent that the connector springs 17, which are mechanically coupled to the substrate 16, resiliently center the substrate 16. According to the Zurcher patent there are four identical J-shaped connector springs 17 mechanically coupled to the substrate 16 and extending downwardly therefrom. These connector springs 17 are mounted on the substrate 16 so that the unstressed angle is such that its U-shaped bend extends inwardly towards the median line of the sidewall 15 of the module frame of the battery holder 10 in such a direction that it is urged towards the bottom of its respective slot, thereby resiliently mounting the substrate 16 in a lateral direction with respect to the module casing 12.

In FIG. 3 an exploded view of a modular electronic assembly 30 is shown. The modular electronic assembly 30 has a substrate 31, on which an integrated circuit chip 32 is mounted and an array of light emitting diodes 33, activated by the electronic circuitry of the integrated circuit chip 32, a module cap 34, which is concentrically, slightly larger than the substrate 31, and a pair of batteries 11. The modular assembly 30 has its integrated circuit chip 32 electrically coupled to the batteries 11 through the printed circuit on the substrate 31. The modular electronic assembly 30 also has an improved battery holder 35, which includes a module frame 36 having a front surface and a back surface, a metal plate 37, which is secured to the back surface of the module frame by a pair of screws 38, and a conducting ring 39. The module frame 36 has a pair of sidewalls 40 extending above its periphery adjacent to the front surface, which is concentrically, slightly larger than the module cap 34 so that the substrate 31 rests on the front surface of the module frame 36 between its sidewalls 40 and the module cap 34 rests on the substrate 31 between the sidewalls 40 of the module frame 36 to which it is either chemically or mechanically joined.

Referring to FIG. 4 which is a back plan view of the module frame 36 shows the metal plate 37 attached to the module frame 36 with a set of screws 38. By referring to FIG. 5 an alternative embodiment of the improved battery holder 30 which has a set of plastic snaps 41 disposed on the back surface of the module frame 36 is shown.

Referring again to FIG. 3 a set of J-shaped connector springs 17 of a first type is shown mechanically and electrically coupled to the substrate 31 and mechanically coupled to the module frame 36. One of the connector springs 17 is electrically coupled to the pair of batteries 11 through the printed circuit on the substrate 31 and also electrically coupled to the conducting ring 39. The rest of the connector springs 17 are adapted to be electrically coupled mechanically to the conducting ring 39. The connector springs 17 are identical to the connector springs 17 of the prior art battery holder 10 shown in FIG. 1, but they do not perform any mechanical function in the improved battery holder 35 because the sidewalls 40 of the module frame 36 secures the substrate 31 in the lateral direction across its front surface.

Two additional embodiments of the improved battery holder 30 have connector springs 42 and 43 of a second type and of a third type shown respectively in FIG. 6 and FIG. 7. The connector spring 42 of the second type has an L-shaped base 44 which is soldered to the substrate 31. The connector spring 43 has a U-shaped base 45 that clips onto the substrate 31.

Referring once again to FIG. 3 the module frame 36 has a ridge 46 disposed along its side between the peripheries of its front and back surfaces. The conducting ring 39 is a metal band which fits adjacent to the ridge 45 and the periphery of the back surface of the module frame 36. It has a set of tabs 47, each tab 47 is aligned with a connector spring 17. When the modular electronic assembly 30 is inserted into a casing that is non-metallic having plungers, that are also non-metallic, one of the plungers presses against a tab 47 and against a connector spring 17 to provide a conduction path. An alternative embodiment of the improved battery holder 30 has a conductive, rubber o-ring 48, disposed adjacent to the ridge 46, to replace the conducting ring 39.

When the modular electronic assembly 30 shown in the exploded view of FIG. 3 is assembled the module cap 34 is either chemically or mechanically joined to the extended sidewalls 40 of the module frame 36 and exerts a force against the top surface of the substrate 31. This force is counteracted by a force transmitted by the set of screws 38 through the metal plate 37 and the batteries 11 to the bottom surface of the substrate 31 thereby making the electronic modular assembly 30 mechanically independent of the casing 12. A modular electronic assembly using the prior art battery holders 10 is not mechanically independent of the casing 12. Furthermore, the conducting ring 39 allows the use of a plastic plunger because there is no need for the casing 12 to serve as a conduction path.

Until the present invention the modular electronic assembly would not operate outside the metallic casing in which they were placed because the metallic casing provided a conduction path from the battery to the electronic components of the modular electronic assembly. Furthermore, the substrate of the modular electronic assembly was secured to the battery holder by either resiliently mounted connector springs or a silicone rubber adhesive. The advantage of a battery holder of the present invention is that it not only allows the electronic modular assembly to operate outside the casing but it also allows the modular electronic assembly to operate in a plastic casing. Another advantage of the present invention is that it secures the substrate by sandwiching it between the module cap and the front surface of the module frame by forces transmitted through the pair of batteries and the metal plate.

From the foregoing it can be seen that an improved battery holder has been described. The battery holder includes a module frame which is formed from a plastic material and which has sidewalls adapted to receive the module cap and the substrate therebetween. Furthermore, it should be noted that the schematics of the battery holder are not drawn to scale and the distances of and between figures are not to be considered significant.

Accordingly, it is intended that the foregoing disclosure and showing made in the drawing shall be considered only as illustrations of the principle of the present invention.

What is claimed is:

1. In a modular electronic assembly which has a substrate, on which an integrated circuit is mounted, and a module cap, which is concentrically, slightly larger than the substrate, a battery holder, which is adapted to be placed in a casing and which holds a plurality of batteries, comprising:
   a. a module frame formed from a non-conductive material having a front surface, a sidewall, and a back surface and being concentrically, slightly larger than the module cap, said front surface of said module frame being adapted to receive the substrate thereon, a portion of said sidewall extending above the periphery adjacent to said front surface of said module frame, and a plurality of holes perpendicular to said front surface adapted to receive the batteries; and
   b. means for securing the batteries within said holes coupled to said back surface of said module frame, formed from a conductive material.

2. In a modular electronic assembly which has a substrate, on which an integrated circuit is mounted, and a module cap, which is concentrically, slightly larger than the substrate, a battery holder according to claim 1 wherein said means for securing the batteries is a metal plate fastened to said back surface by a pair of screws.

3. In a modular electronic assembly which has a substrate, on which an integrated circuit is mounted, and a module cap, which is concentrically, slightly larger than the substrate, a battery holder according to claim 1 wherein said means for securing the batteries is a metal plate fastened to said back surface by a plurality of snaps coupled to said back surface.

4. In a modular electronic assembly which has a substrate, on which an integrated circuit is mounted, and a module cap, which is concentrically, slightly larger than the substrate, a battery holder according to claim 2 wherein said module frame has a ridge protruding from its sidewall and disposed between said front surface and said back surface and said battery holder also comprises:
   a. a plurality of spring connectors, electrically coupled to the integrated circuit and mechanically coupled to the substrate, which are disposed within said module frame adjacent to said sidewall.

5. In a modular electronic assembly which has a substrate, on which an integrated circuit is mounted, and a module cap, which is concentrically, slightly larger than the substrate, a battery holder according to claim 4 wherein said spring connectors are electrically coupled to the integrated circuit by actuating means mechanically coupled to the casing and electrically coupled to the batteries comprising:
   a. conducting means for conducting electrical power from the batteries to the integrated circuit through said spring connectors, one of which is electrically coupled to the batteries and is also electrically coupled to said conducting means and the rest of which are adapted to be electrically coupled mechanically to said conducting means, said conducting means coupled to said module frame adjacent to said ridge; and
   b. a plurality of plungers, each aligned with one of said spring connectors and adapted to mechanically force conducting means against said spring connectors thereby electrically coupling said conducting means to said spring connectors.

6. In a battery holder according to claim 5 actuating means which comprises a conductive, rubber o-ring coupled to said ridge of said module frame.

7. In a battery holder according to claim 5 actuating means which comprises a metal ring having a slit so that it may be placed onto said ridge of said module frame and having a plurality of flanges, each aligned with one of said spring connectors.

* * * * *